(12) United States Patent
Kawasaki et al.

(10) Patent No.: US 7,322,323 B2
(45) Date of Patent: Jan. 29, 2008

(54) VALVE ACTUATION CONTROL APPARATUS FOR INTERNAL COMBUSTION ENGINE

(75) Inventors: Takashi Kawasaki, Toyota (JP); Naohide Fuwa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 100 days.

(21) Appl. No.: 11/374,123

(22) Filed: Mar. 14, 2006

(65) Prior Publication Data

US 2006/0213468 A1  Sep. 28, 2006

(30) Foreign Application Priority Data

Mar. 25, 2005  (JP) ............... 2005-087770

(51) Int. Cl.
*F01L 1/34* (2006.01)

(52) U.S. Cl. ............... 123/90.15; 123/90.16; 123/90.17; 123/90.31

(58) Field of Classification Search ............ 123/90.15, 123/90.16, 90.17, 90.31
See application file for complete search history.

(56) References Cited

U.S. PATENT DOCUMENTS

2002/0014215 A1* 2/2002 Ishii et al. ............... 123/90.17

FOREIGN PATENT DOCUMENTS

| JP | A 2001-263015 | 9/2001 |
| JP | A 2002-161766 | 6/2002 |
| JP | A 2002-357136 | 12/2002 |

* cited by examiner

*Primary Examiner*—Zelalem Eshete
(74) *Attorney, Agent, or Firm*—Oliff & Berridge, PLC (57) ABSTRACT

After a delay control for extending a period from when an engine stop request is made to when the engine actually stops is started, the electronic control unit changes the valve timing and the valve duration of an intake valve to valve timing and valve duration suitable for starting the engine. When changing the valve timing and the valve duration after the start of the delay control, the electronic control unit changes one of the valve timing and the valve duration of the intake valve based on the other such a valve overlap becomes less than or equal to a predetermined value.

7 Claims, 7 Drawing Sheets

VALVE ACTUATION CONTROL APPARATUS FOR INTERNAL COMBUSTION ENGINE

BACKGROUND OF THE INVENTION

The present invention relates to a valve actuation control apparatus for an internal combustion engine that controls valve parameters such as valve timing and valve duration of engine valves.

Variable valve actuation mechanisms that change the valve parameters of engine valves such as intake valves and exhaust valves according to the engine operating state have been made commercially available.

Variable valve actuation mechanisms include variable valve timing mechanisms. A variable valve timing mechanism changes the rotational phase of a camshaft relative to that of a crankshaft, thereby changing the valve timing of engine valves that are opened and closed by the camshaft.

Since such a variable valve timing mechanism is actuated by a drive source obtained from an engine power, such as hydraulic pressure and electricity, the mechanism is stopped when the engine stops. Therefore, the valve timing after the engine stops is the valve timing immediately before the engine stops, that is, the valve timing that has been set during the operation of the engine. The valve timing is not necessarily suitable for starting the engine. Thus, depending on conditions, starting performance of the engine could be degraded next time the engine is started.

Accordingly, Japanese Laid-Open Patent Publication No. 2002-161766 discloses an apparatus that performs a delay control for extending the period from when an engine stop request is made (when a driver turns off the ignition switch) to when the engine actually stops. After the delay control is started, the apparatus activates a variable valve timing mechanism to set the valve timing to predetermined valve timing suitable for starting the engine.

Meanwhile, Japanese Laid-Open Patent Publication No. 2001-263015 discloses a variable valve duration mechanism that is one type of a variable valve actuation mechanism driven by a drive source obtained from the engine power. The variable valve duration mechanism changes the valve duration of an engine valve that corresponds to a period during which the engine valve is open in accordance with the engine operating state.

Even such a variable valve duration mechanism is stopped when the engine stops. Therefore, the valve duration after the engine stops is the valve duration immediately before the engine stops, that is, the valve duration that has been set during the operation of the engine. The valve duration is not necessarily suitable for starting the engine. It is therefore desired that, after the delay control is started, the valve duration, which is changed by the variable valve duration mechanism, be changed to valve duration suitable for starting the engine.

When the valve timing and the valve duration are changed after the delay control is started in an internal combustion engine that is provided with a variable valve timing mechanism and a variable valve duration mechanism, the valve overlap is changed not only by changes in the valve timing, but also changes in the valve duration. This in some cases excessively increases the valve overlap during the execution of the delay control. An excessively increased valve overlap during the execution of the delay control is likely to cause a misfire. If the engine stalls due to such misfires, the delay control is interrupted.

SUMMARY OF THE INVENTION

Accordingly, it is an objective of the present invention to provide a valve actuation control apparatus for an internal combustion engine that, when changing valve timing and valve duration after starting a delay control, appropriately adjusts the valve overlap during the execution of the delay control.

To achieve the above objectives, the present invention provides a valve actuation control apparatus for an internal combustion engine that has a variable valve timing mechanism that changes valve timing of an engine valve and a variable valve duration mechanism that changes valve duration of the engine valve. The apparatus includes a control section that controls the variable valve timing mechanism and the variable valve duration mechanism. After a delay control for extending a period from when an engine stop request is made to when the engine actually stops is started, the control section changes the valve timing and the valve duration to valve timing and valve duration suitable for starting the engine. When changing the valve timing and the valve duration after the start of the delay control, the control section changes one of the valve timing and the valve duration based on the other such that a valve overlap becomes less than or equal to a predetermined value.

The present invention provides another valve actuation control apparatus for an internal combustion engine that has a variable valve timing mechanism that changes valve timing of an engine valve and a variable valve duration mechanism that changes valve duration of the engine valve. The apparatus includes a control section that controls the variable valve timing mechanism and the variable valve duration mechanism. After a delay control for extending a period from when an engine stop request is made to when the engine actually stops is started, the control section changes the valve timing and the valve duration to valve timing and valve duration suitable for starting the engine. When changing the valve timing and the valve duration after the start of the delay control, the control section changes one of the valve timing and the valve duration based on the other such that a valve overlap becomes an amount that corresponds to a misfire limit value.

Further, the present invention provides a valve actuation control apparatus for an internal combustion engine that has a variable valve timing mechanism that changes valve timing of an engine valve and a variable valve duration mechanism that changes valve duration of the engine valve. An actuation position of the variable valve duration mechanism is determined based on a relative movement amount from a reference position. The apparatus includes a control section that controls the variable valve timing mechanism and the variable valve duration mechanism. After a delay control for extending a period from when an engine stop request is made to when the engine actually stops is started, the control section changes the valve timing to valve timing suitable for starting the engine, changes the actuation position of the variable valve duration mechanism to the reference position where the valve duration is reduced, learns the reference position, and thereafter changes the valve duration to valve duration suitable for starting the engine.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A valve actuation control apparatus for an internal combustion engine 1 according to a first embodiment of the present invention will now be described with reference to FIGS. 1 to 8.

Figure 1:
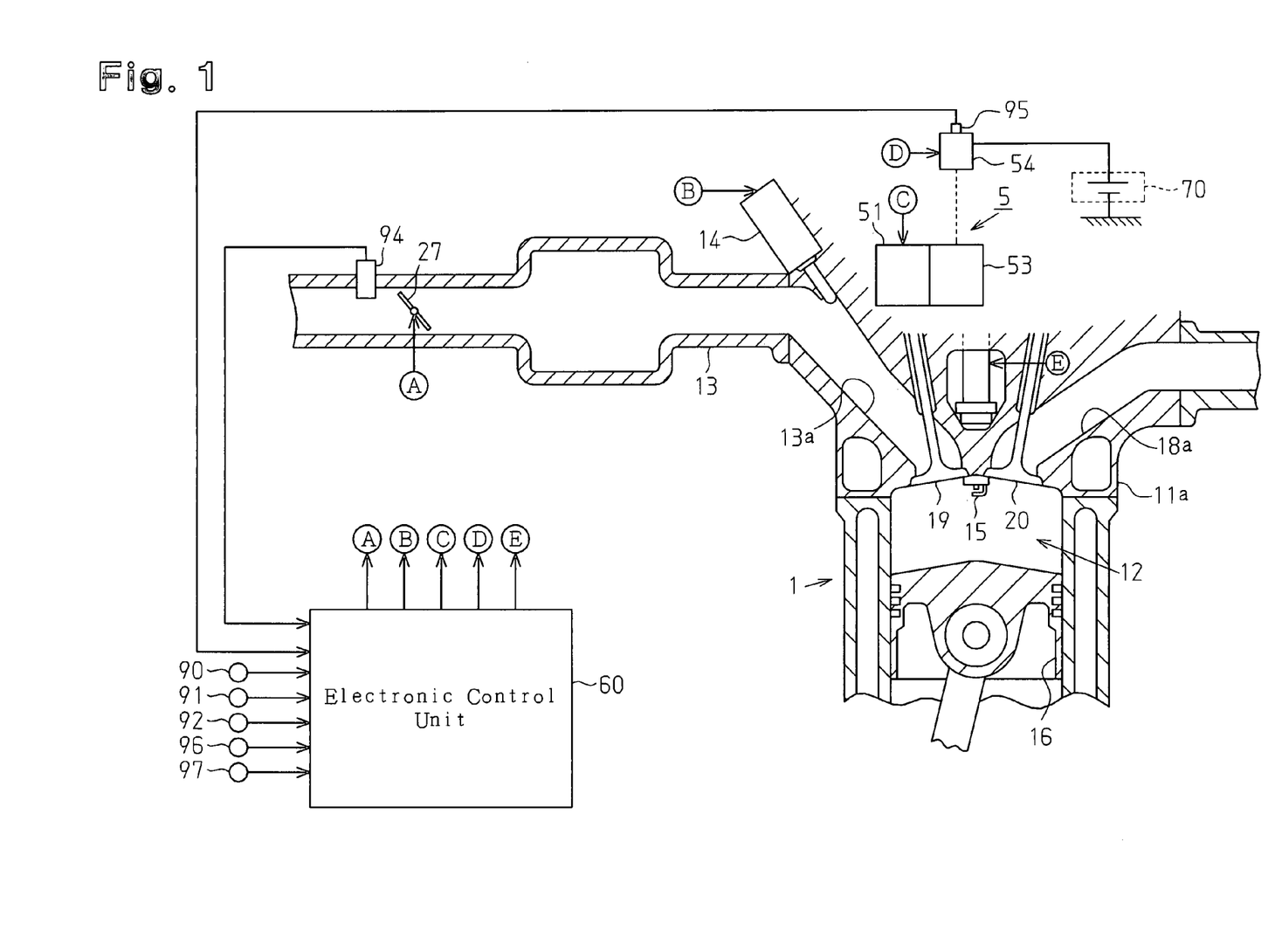
FIG. 1 is a diagram illustrating an internal combustion engine to which a valve actuation control apparatus according to a first embodiment of the present invention is applied.

FIG. 1 illustrates the configuration of the engine 1 according to this embodiment. The engine 1 includes a variable valve actuation unit 5. As shown in FIG. 1, the engine 1 has combustion chambers 12 (only one is shown). The engine 1 also has fuel injection valves 14, ignition plugs 15, intake valves 19, exhaust valves 20, and pistons 16, each corresponding to one of the combustion chambers 12. In the following, only one set of a combustion chamber 12, an injection valve 14, an ignition plug 15, an intake valve 19, an exhaust valve 20, and a piston 16 will mainly be discussed as representing all the components. As shown in FIG. 1, air is drawn into the combustion chamber 12 through an intake passage 13 and an intake port 13a. The fuel injection valve 14 provided in the intake passage 13 supplies fuel the amount of which corresponds to the intake air amount to the combustion chamber 12. When the air-fuel mixture is ignited by the ignition plug 15, the air-fuel mixture is burned. This causes the piston 16 to reciprocate, thereby rotating an engine output shaft, which is a crankshaft. An alternator, which is a generator, is coupled to the crankshaft. Electricity generated by the alternator is stored in a battery 70.

A throttle valve 27 is provided in the intake passage 13 to adjust the intake air amount. The opening degree of the throttle valve 27 is adjusted by controlling a motor for opening and closing the throttle valve 27.

The intake port 13a and the combustion chamber 12 are connected to and disconnected from each other by opening and closing the intake valve 19, while an exhaust port 18a and the combustion chamber 12 are connected to and disconnected from each other by opening and closing the exhaust valve 20. The intake valve 19 and the exhaust valve 20 are opened and closed in accordance with rotation of an intake camshaft and an exhaust camshaft to which rotation of the crankshaft is transmitted.

The variable valve actuation unit 5 is provided in a cylinder head 11a of the engine 1 to change the valve parameters of the intake valve 19. The variable valve actuation unit 5 includes a variable valve timing mechanism 51 that changes the valve timing of the intake valve 19, and a variable valve duration mechanism 53 that changes a maximum valve lift VL and valve duration INCAM of the intake valve 19. The valve duration INCAM of the intake valve 19 corresponds to a period during which the intake valve 19 is open.

Figure 2:
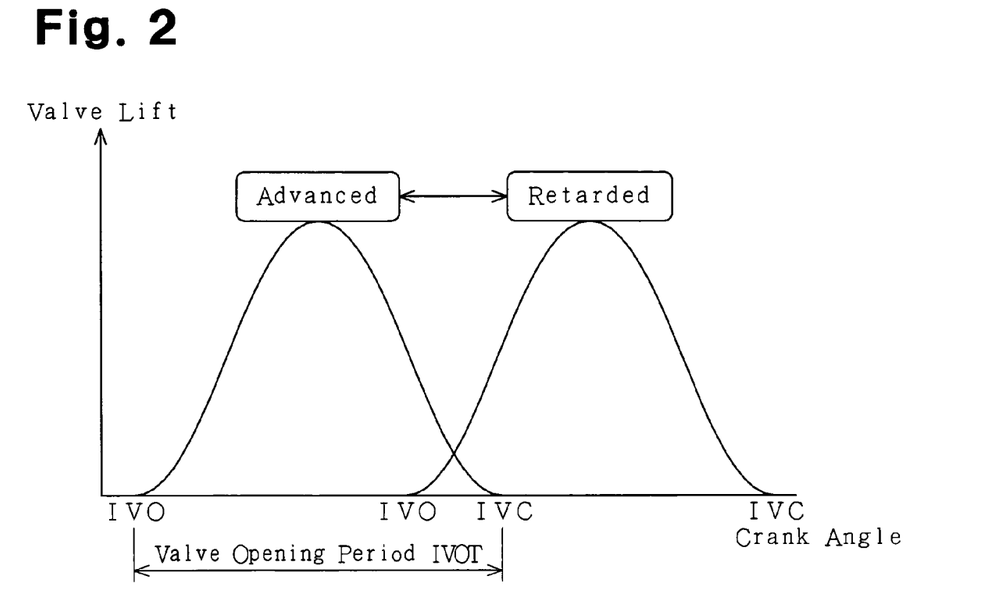
FIG. 2 is a schematic diagram showing the valve timing of an intake valve changed by a variable valve timing mechanism according to the first embodiment.

The variable valve timing mechanism 51 is actuated by hydraulic pressure generated by a hydraulic pump driven by the engine power. The variable valve timing mechanism 51 changes the relative rotational phase between the intake camshaft actuating the intake valve 19 and the crankshaft of the engine 1, thereby varying the valve timing INVT of the intake valve 19. As the valve timing INVT is changed, the point at which the intake valve 19 opens (IVO) and the point at which the intake valve 19 closes (IVC) are both advanced or retarded by the same degrees of crank angle. That is, in the state where the period during which the intake valve 19 is open (IVOT) is constant as shown in FIG. 2, the intake valve opening point IVO and the intake valve closing point IVC are advanced or retarded. When the valve timing INVT is delayed, the valve opening point IVO of the intake valve 19 is delayed. This reduces the valve overlap.

Figure 3:
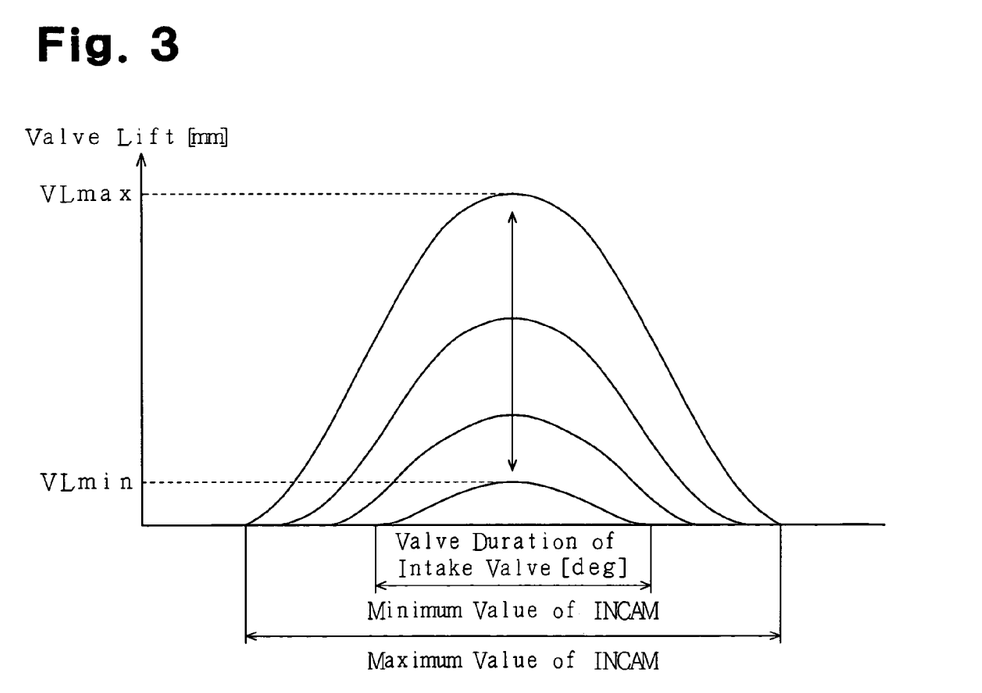
FIG. 3 is a schematic diagram showing the valve duration and the maximum valve lift of the intake valve changed by a variable valve duration mechanism according to the first embodiment.

The variable valve duration mechanism 53 changes the valve duration INCAM, which is the valve opening period IVOT, and the maximum value of the valve lift, which is the maximum valve lift VL, of the intake valve 19. The variable valve duration mechanism 53 is actuated by an electric motor 54. In other words, the variable valve duration mechanism 53 is actuated by the electricity of the alternator driven by the engine power (specifically, electricity that is stored in the battery 70 through the actuation of the alternator). The variable valve duration mechanism 53 continuously changes the maximum valve lift VL of the intake valve 19 between an upper limit valve lift VLmax and a lower limit valve lift VLmin. In synchronization with the continuous change in the maximum valve lift VL, the valve duration INCAM of the intake valve 19 is continuously changed. That is, as the maximum valve lift VL is reduced, the valve duration INCAM is reduced accordingly. The valve duration INCAM is a maximum at the upper limit lift VLmax, and the valve duration INCAM is a minimum at the lower limit lift VLmin. When the valve duration INCAM is reduced, the opening point of IVO of the intake valve 19 is delayed. This reduces the valve overlap.

The engine 1 has various sensors for detecting the operating state of the engine 1. For example, a crank angle sensor 90 detects the rotational phase of the crankshaft, or the crank angle. The engine speed NE is obtained from signals from the crank angle sensor 90. An accelerator pedal sensor 91 detects the depression amount of an accelerator pedal (accelerator pedal depression degree ACCP), and a throttle sensor 92 detects the opening degree of the throttle valve 27 (throttle opening degree TA). An intake air amount sensor 94 detects an intake air amount GA drawn into the combustion chamber 12, and a valve duration sensor 95 detects the valve duration INCAM of the intake valve 19, or the actuation position of the variable valve duration mechanism 53. A valve timing sensor 96 detects the valve timing INVT of the intake valve 19. Also, whether the driver has made an engine stop request is determined based on the state of an ignition switch 97, or whether the ignition switch 97 is on or off.

Various control procedures of the engine 1 are executed by an electronic control unit 60. The electronic control unit 60 serves as a control section. The electronic control unit 60 has a microcomputer as a main component and receives various detected signals from the sensor listed above. Based on these signals, a central processing unit (CPU) of the electronic control unit 60 performs computation processes according to programs and control data stored in memory. Based on the computation results, the CPU performs various control processes. For example, the CPU controls the operation of the ignition plug 15 and the fuel injection valve 14 based on the engine operating state detected by the above listed sensors. Based on the accelerator pedal depression degree ACCP, the CPU sets a target value of the opening degree of the throttle valve 27, and controls the throttle valve 27, such that the opening degree of the throttle valve 27 seeks the target value. The CPU also controls the actuation of the variable valve timing mechanism 51 and the variable valve duration mechanism 53, such that the valve parameters (the valve timing INVT and the valve duration INCAM) of the intake valve 19 seek a desired values that correspond to the engine operating state.

As described above, the valve duration INCAM, that is, the actuation position of the variable valve duration mechanism 53, is detected by the valve duration sensor 95. In this embodiment, the valve duration sensor 95 is a relative position detector for detecting the amount of movement of a movable body, for example, an encoder.

The relative position detector is a sensor that outputs a pulse signal every time the movable body, or a detection subject, is moved by a predetermined amount. By counting the number of pulse signals, the relative movement amount of the movable body is detected. Also, by defining a reference position of the movable body and detecting the relative movement amount of the movable body from the reference position, the absolute position of the movable body is detected. In this embodiment, the movable range of the variable valve duration mechanism 53 is limited by limiting members such as stoppers. An extreme position in the movable range of the variable valve duration mechanism 53 that corresponds to the minimum value of the valve duration INCAM (hereinafter, referred to as a Lo end) is learned as a reference position. A relative movement amount from the reference position (Lo end) is detected for acquiring the actuation position of the variable valve duration mechanism 53.

When the driver turns off the ignition switch 97, that is, when an engine stop request is made by the driver, the fuel injection and the fuel ignition are readily stopped, so that the engine 1 is stopped. Accordingly, the generation of hydraulic pressure acting as the drive source of the variable valve timing mechanism 51 and the generation of electricity acting as the drive source of the variable valve duration mechanism 53 are stopped. Therefore, the variable valve actuation unit 5 is stopped with the valve parameters immediately before the engine stop. The valve parameters after the engine 1 is stopped are the valve parameters immediately before the engine 1 is stopped, that is, valve parameters that have been set during the operation of the engine 1. The valve parameters are not necessarily suitable for starting the engine 1. Thus, depending on the conditions, the starting performance of the engine 1 could be degraded next time the engine 1 is started.

Accordingly, in this embodiment, a delay control is performed for extending the period from when an engine stop request is made to when the engine 1 actually stops. After the delay control is started, that is, while the hydraulic pressure and electricity are being generated, the variable valve timing mechanism 51 and the variable valve duration mechanism 53 are actuated to change the valve parameters (the valve timing and the valve duration) to predetermined values suitable for starting the engine 1.

Figure 4:
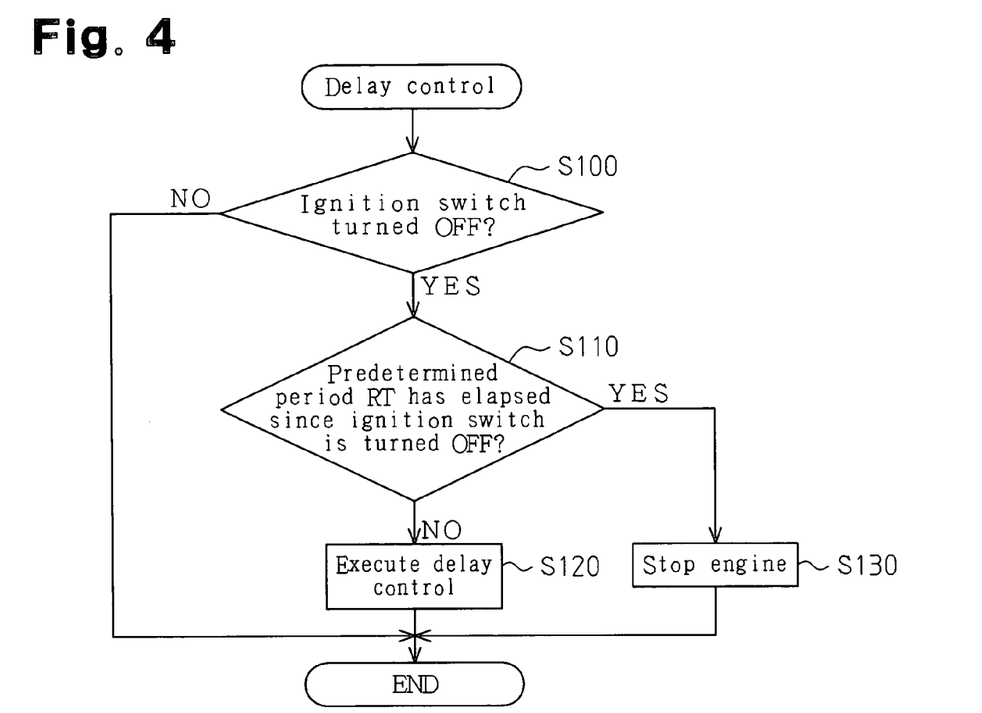
FIG. 4 is a flowchart showing a procedure of a delay control according to the first embodiment.

FIG. 4 shows the procedure of the delay control. The delay control is repeated at predetermined time intervals by the electronic control unit 60.

When the process is started, whether the ignition switch 97 is turned off is determined at step S100. If it is determined that the ignition switch 97 is not turned (NO at step S100), this process is temporarily suspended.

On the other hand, when it is determined that the ignition switch 97 is turned off (YES at step S100), whether a predetermined period RT has elapsed since the ignition switch 97 was turned off is determined at next step S110. The predetermined period RT is determined in advance as a sufficient period required for changing the valve timing INVT at the time of turning the ignition switch 97 off to valve timing suitable for starting the engine 1.

If it is determined that the predetermined period RT has not elapsed (NO at step S110), the delay control is executed. That is, even if the ignition switch 97 is off, the fuel injection and the fuel ignition are continued. During the execution of the delay control, the variable valve timing mechanism 51 and the variable valve duration mechanism 53 are driven to change the valve parameters of the intake valve 19 (the valve timing INVT and the valve duration INCAM) to the predetermined values suitable for starting the engine 1.

On the other hand, when it is determined that the predetermined period RT has elapsed (YES at step S110), it is determined that the process for changing the valve parameters of the intake valve 19 to the predetermined values suitable for starting the engine 1 has been completed. In this case, the fuel injection and the fuel ignition are stopped for stopping the delay control. That is, the engine 1 is stopped at step S130, and the process is temporarily suspended.

When the delay control is started, the valve timing and the valve duration of the intake valve 19 are changed to the values suitable for starting the engine 1.

The valve timing of the intake valve 19 suitable for starting the engine 1 (hereinafter, referred to as an engine starting valve timing INVTst) is set to a delayed valve timing relative to the valve timing that corresponds to idling. More specifically, the most retarded valve timing is set as the engine starting valve timing INVTst. After the delay control is started, the valve timing INVT is changed to the engine starting valve timing INVTst through the actuation of the variable valve timing mechanism 51. Therefore, the engine starting is performed in a state of an extremely small internal EGR amount. This maintains the favorable starting performance of the engine 1.

The valve duration of the intake valve 19 suitable for starting the engine 1 (hereinafter, referred to as an engine starting valve duration INCAMst) is set to valve duration greater than the valve duration that corresponds to idling.

The greater the valve duration during the engine starting, the easier it is to secure a sufficient amount of intake air on the other hand, the smaller the valve duration, that is, the more delayed the valve opening point IVO, the higher the intake air temperature becomes. In this embodiment, in order to secure a sufficient intake air amount and increase the intake air temperature during the engine starting process, the engine starting valve duration INCAMst is set to such a value that the maximum valve lift VL is in the vicinity of an intermediate position between the upper limit valve lift VLmax and the lower limit valve lift VLmin. After the delay control is started, the valve duration INCAM is changed to the engine starting valve duration INCAMst through the actuation of the variable valve duration mechanism 53. The engine starting valve duration INCAMst may be set such that the maximum valve lift VL during the engine starting process becomes the upper limit valve lift VLmax, so that the intake air amount during the engine starting process is maximized.

In this manner, after the delay control is started, the variable valve timing mechanism 51 is actuated such that the valve timing INVT becomes the engine starting valve timing INVTst, and the variable valve duration mechanism 53 is actuated such that the valve duration INCAM becomes the engine starting valve duration INCAMst.

When the valve timing INVT and the valve duration INCAM are changed, the valve overlap is varied not only by changes in the valve timing, but also changes in the valve duration. This in some cases excessively increases the valve overlap during the execution of the delay control. An excessively increased valve overlap during the execution of the delay control is likely to cause a misfire. If the engine stalls due to such misfires, the delay control is interrupted.

Thus, in this embodiment, the valve duration INCAM is changed in the manner described below after the delay control is started so that the valve overlap during the execution of the delay control is less than or equal to a predetermined value, more specifically, the valve overlap becomes a value corresponding to a misfire limit value. The valve overlap during the execution of the delay control is appropriately controlled.

A procedure of a valve duration change process executed after the delay control is started will now be described with reference to FIG. 5. The process is repeated at predetermined time intervals by the electronic control unit 60 after the delay control is started until the valve duration INCAM reaches the engine starting valve duration INCAMst.

When the process is started, the valve duration INCAM is changed based on the current valve timing INVT and the valve overlap that corresponds to the misfire limit value (at step S200). The valve overlap corresponding to the misfire limit value refers to the maximum value in a range of valve overlap that prevents the occurrence of misfires, in other words, the maximum value in a range of the valve overlap that is below the level above which the valve overlap causes a misfire. The valve overlap corresponding to the misfire limit value is set based on the misfire occurrence range, which will be discussed below.

Then, whether the current valve timing INVT has reached the engine starting valve timing INVTst is determined at step S210.

If it is determined that the valve timing INVT has not reached the engine starting valve timing INVTst (NO at step S210), this process is temporarily suspended. Then, until the valve timing INVT reaches the engine starting valve timing INVTst, the valve duration INCAM continues being changed at step S200.

On the other hand, if it is determined that the valve timing INVT has reached the engine starting valve timing INVTst (YES at step S210), since change of the valve overlap due to changes in the valve timing INVT has ended, the valve duration INCAM is changed to the engine starting valve duration INCAMst at the maximum rate (at next step S220). This process is then ended.

The misfire occurrence range will now be described. The misfire occurrence range, in which a misfire occurs, is defined by combinations of values of the valve timing INVT and valve duration INCAM. In this embodiment, combinations of the values of the valve timing INVT and the valve duration INCAM at which a misfire occurs are learned as misfire occurrence values, and the misfire occurrence range is defined in relation to the misfire occurrence values.

Figure 6:
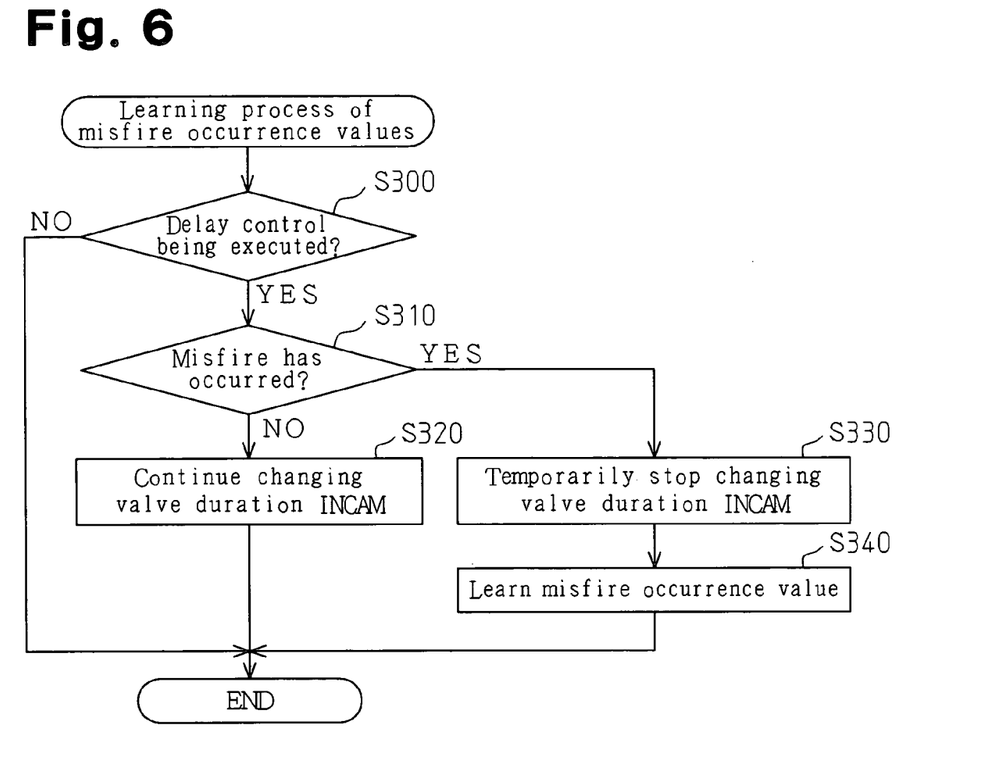
FIG. 6 is a flowchart showing a procedure of a learning process of misfire occurrence values according to the first embodiment.

FIG. 6 shows a process for learning misfire occurrence values. The process is repeated at predetermined time intervals by the electronic control unit 60 during the execution of the delay control.

When the process is started, whether the delay control is being executed is determined at step S300. If it is determined that the delay control is not being executed (NO at step S300), the process is temporarily suspended.

On the other hand, if it is determined that the delay control is being executed, that is, when the valve timing INVT and the valve duration INCAM are being changed (YES at step S300), whether a misfire has occurred is determined at next step S310. The occurrence of a misfire may be determined in any suitable manner. For example, a misfire may be determined to be occurring when an increase of the exhaust temperature due to combustion of fuel in unburned air-fuel mixture in the exhaust passage is detected. Alternatively, a misfire may be determined to be occurring when leaning of air-fuel ratio due to oxygen contained in unburned air-fuel mixture is detected.

When it is determined that no misfire is occurring (NO at step S310), the changing process of the valve duration INCAM after starting of the delay control described above continues being executed at step S320. Then, the process is temporarily suspended.

When it is determined that a misfire has occurred (YES at step S310), the change process of the valve duration INCAM after starting of the delay control described above is temporarily suspended at step S330. At this time, a misfire occurrence value is learned at step S340, and the process is temporarily suspended.

Figure 7:
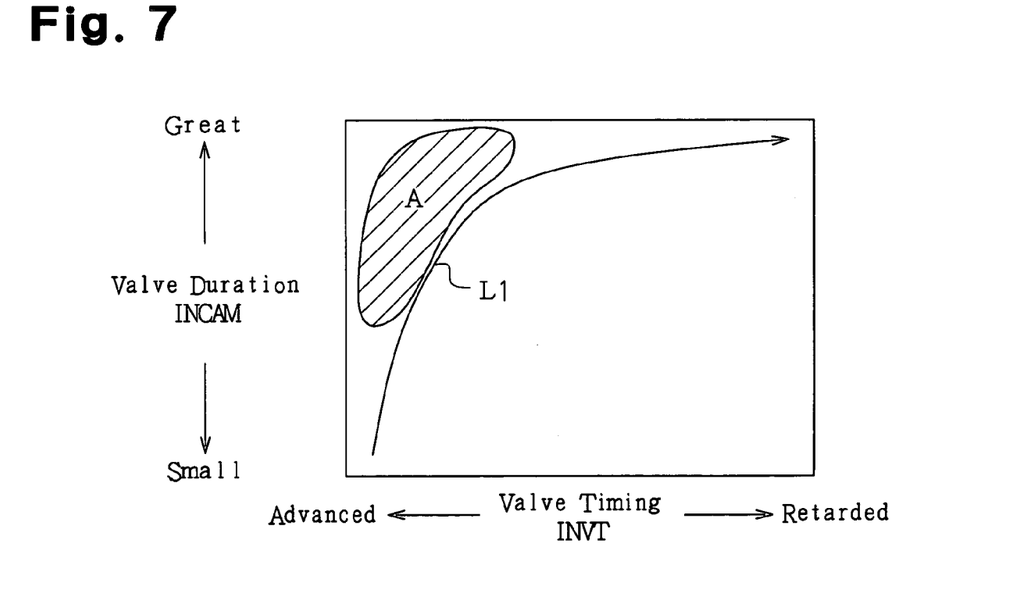
FIG. 7 is a conceptual diagram showing a misfire occurrence range.

The misfire occurrence value is stored in the memory of the electronic control unit 60. In this repeatedly executed process, various misfire occurrence values are stored in the memory every time the occurrence of a misfire is determined. Accordingly, a misfire occurrence range represented by range A in FIG. 7 is formed in the memory.

Figure 5:
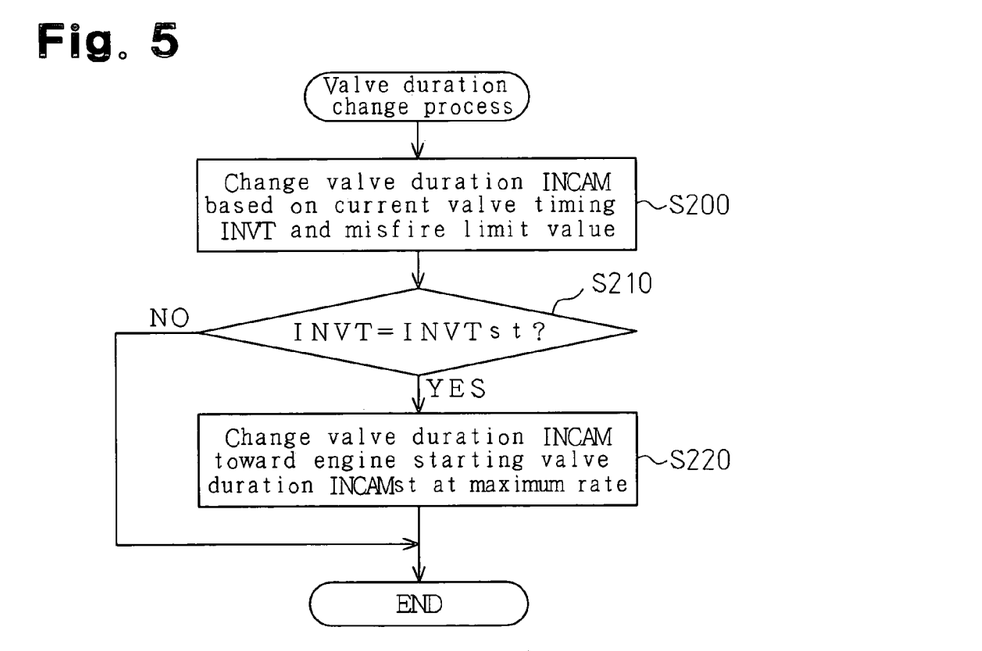
FIG. 5 is a flowchart showing a procedure of a valve duration change process according to the first embodiment.

At step S200 of the valve duration change process of FIG. 5, the valve duration INCAM is changed in accordance with the value of the valve timing INVT at the time of execution of step S200, such that the combination of the valve timing INVT and the valve duration INCAM (indicated by line L1 in FIG. 7) maximizes the valve overlap while avoiding the misfire occurrence range. Accordingly, the valve timing INVT and the valve duration INCAM change along line L1 during the execution of the delay control. That is, during the execution of the delay control, the valve timing INVT and the valve duration INCAM are changed with the valve overlap maintained at a value that corresponds to the misfire limit value. In other words, the valve duration INCAM is changed based on the valve timing INVT and the valve overlap corresponding to the misfire limit value.

If the learning of the misfire occurrence values is performed in the normal operation of the engine 1, the occurrence of misfires can degrade the drivability. However, in this embodiment, since the learning is performed during the execution of the delay control, such degradation of the drivability during the normal operation of the engine 1 is prevented.

Figure 8:
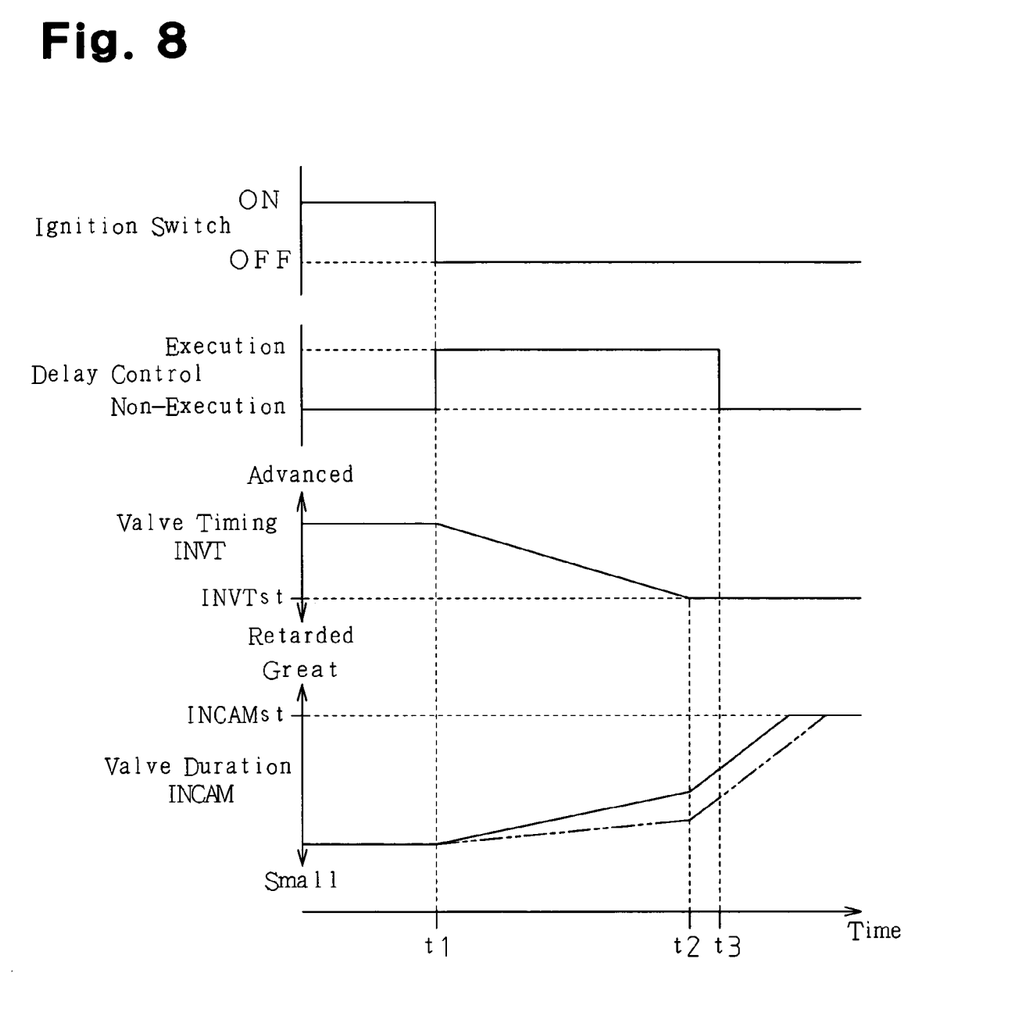
FIG. 8 is a time chart showing one example of changes in the valve timing and the valve duration when the valve duration change process according to the first embodiment is executed.

FIG. 8 shows changes in the valve timing INVT and the valve duration INCAM during the execution of the valve duration change process. FIG. 8 represents a situation where the ignition switch 97 is turned off during idling.

As shown in FIG. 8, when the ignition switch 97 is turned off at time t1, the delay control is started. At the beginning of the delay control, the valve timing INVT starts being changed toward the engine starting valve timing INVTst, and the valve duration INCAM starts being changed toward the engine starting valve duration INCAMst.

In the process of the change of the valve duration INCAM, until the valve timing INVT reaches the engine starting valve timing INVTst, the valve overlap is less than or equal to a predetermined value. Specifically, the valve duration INCAM is changed in accordance with changes in the valve timing INVT such that valve overlap that corresponds to the misfire limit value is obtained. That is, the valve timing INVT and the valve duration INCAM are correlated with each other by means of a parameter, or the valve overlap, and the valve duration INCAM is changed in accordance with changes in the valve timing INVT. Therefore, during the execution of the delay control, the valve overlap is prevented from being excessively great, and is adjusted to an appropriate value during the execution of the delay control.

When the valve timing INVT reaches the engine starting valve timing INVTst at time t2, the valve duration INCAM is changed toward the engine starting valve duration INCAMst at the maximum rate.

When the predetermined period RT has elapsed since the delay control is started, the delay control is ended, and the engine 1 is stopped (time t3). If the valve duration INCAM has not reached the engine starting valve duration INCAMst at the end of the delay control, the variable valve duration mechanism 53 is actuated by the electricity of the battery 70 after the delay control is ended.

In this manner, in the case where the variable valve duration mechanism 53 is actuated after the end of the delay control, that is, in the case where the variable valve duration mechanism 53 is actuated with the engine 1 not running, a greater amount of electricity is required for actuating the mechanism 53 since a sliding resistance is greater than the case where the mechanism 53 is actuated while the engine 1 is operating. In this embodiment, when the valve duration INCAM is changed during the execution of the delay control, the valve overlap is adjusted to the maximum value of the valve overlap range in which a misfire does not occur. In other words, the valve duration INCAM is changed such that the valve opening point IVO is most advanced while preventing the occurrence of misfires. Therefore, the valve duration INCAM during the execution of the delay control is changed at the fastest rate possible while preventing the occurrence of misfires. Thus, compared to the case where the valve duration INCAM is changed at a slow rate (shown by alternate long and two short dashes line in FIG. 8), the valve duration INCAM at the end of the delay control (time t3) is closer to the engine starting valve duration INCAMst. Accordingly, after the end of the delay control, the power consumption of the variable valve duration mechanism 53 is minimized.

When setting the valve timing INVT and the valve duration INCAM during the normal operation of the engine 1, if these valve parameters are set such that the valve overlap corresponds to the misfire limit value, which is obtained through learning of the misfire occurrence values, the valve overlap is maximized in the range for preventing the occurrence of misfires. In this case, a sufficient amount of the internal EGR amount is secured, so that the fuel economy is improved. Also, since the valve duration INCAM is maximized in the range in which the occurrence of misfires is prevented, the valve opening period IVOT is also maximized. Thus, the pumping loss is reduced, which improves the fuel economy.

The valve actuation control apparatus according to the present embodiment described above provides the following advantages.

(1) After the delay control is started, the valve timing INVT and the valve duration INCAM are each changed to the engine starting valve timing INVTst and the engine starting valve duration INCAMst. At the same time, the valve duration INCAM is changed based on the valve timing INVT such that the valve overlap is less than or equal to a predetermined value. That is, the valve duration INCAM is changed such that the valve overlap is less than or equal to the predetermined value in relation to the changing valve timing INVT.

In this manner, when changing the valve timing INVT and the valve duration INCAM after the delay control is started, the valve timing and the valve duration are correlated with each other using a parameter such as the valve overlap. This reliably permits the valve overlap during the execution of the delay control to be less than or equal to the predetermined value. Therefore, the valve overlap is appropriately adjusted during the execution of the delay control. Also, the valve overlap is prevented from being excessively great during the execution of the delay control.

(2) When changing the valve duration INCAM based on the valve timing INVT such that the valve overlap during the execution of the delay control becomes less than or equal to the predetermined value, the valve overlap is adjusted to a value that corresponds to the misfire limit value. Therefore, the valve duration INCAM is changed such that the valve overlap becomes equal to the misfire limit value in relation to the changing valve timing INVT. In this manner, when changing the valve timing INVT and the valve duration INCAM after the delay control is started, the valve timing and the valve duration are correlated with each other using a parameter such as the valve overlap. This reliably permits the valve overlap during the execution of the delay control to be equal to the misfire limit value. Therefore, the valve overlap is appropriately adjusted during the execution of the delay control. Also, the occurrence of misfires due to an excessive valve overlap during the execution of the delay control is prevented.

(3) When a misfire occurs while the valve timing INVT and the valve duration INCAM are being changed, the combination of the valve timing INVT and the valve duration INCAM at the time of the misfire occurrence is learned as a misfire occurrence value. The valve timing INVT and the valve duration INCAM are changed such that the valve overlap is maximized while avoiding the misfire occurrence range defined by the misfire occurrence values. Therefore, the valve timing INVT and the valve duration INCAM are changed while maintaining the valve overlap that corresponds to the misfire limit value.

If the learning of the misfire occurrence values is performed in the normal operation of the engine 1, the occurrence of misfires can degrade the drivability. However, in this embodiment, since the learning is performed during the execution of the delay control, degradation of the drivability due to the performance of the learning during the normal operation of the engine 1 is prevented.

(4) The valve timing of the intake valve 19 for starting the engine 1 is delayed relative to the valve timing for idling. Therefore, the engine 1 can be started with a significantly small internal EGR amount. This maintains the favorable starting performance of the engine 1.

Also, the valve duration of the intake valve 19 for starting the engine 1 is set greater than that during idling. Thus, a sufficient amount of the intake air amount for starting the engine 1 is obtained. This reliably guarantees the starting performance of the engine 1.

When setting the valve duration for starting the engine 1 greater than that during idling, the valve overlap can be excessively increased. In this respect, the valve overlap during the execution of the delay control is appropriately controlled as described above. Therefore, when setting the valve timing and the valve duration during starting of the engine 1 in the above described manner to improve the starting performance of the engine 1, the valve overlap is appropriately adjusted during the execution of the delay control.

A valve actuation control apparatus for an internal combustion engine according to a second embodiment of the present invention will now be described with reference to FIGS. 9 and 10. In this embodiment, as with the first embodiment, after the delay control is started, the variable valve timing mechanism 51 is actuated such that the valve timing INVT becomes the engine starting valve timing INVTst, and the variable valve duration mechanism 53 is actuated such that the valve duration INCAM becomes the engine starting valve duration INCAMst.

However, in this embodiment, the valve duration INCAM is changed in a manner different from that of the first embodiment. The second embodiment is similar to the first embodiment except for the difference of the manner in which the valve duration INCAM is changed. Accordingly, the valve duration change process of this embodiment will be discussed below.

Figure 9:
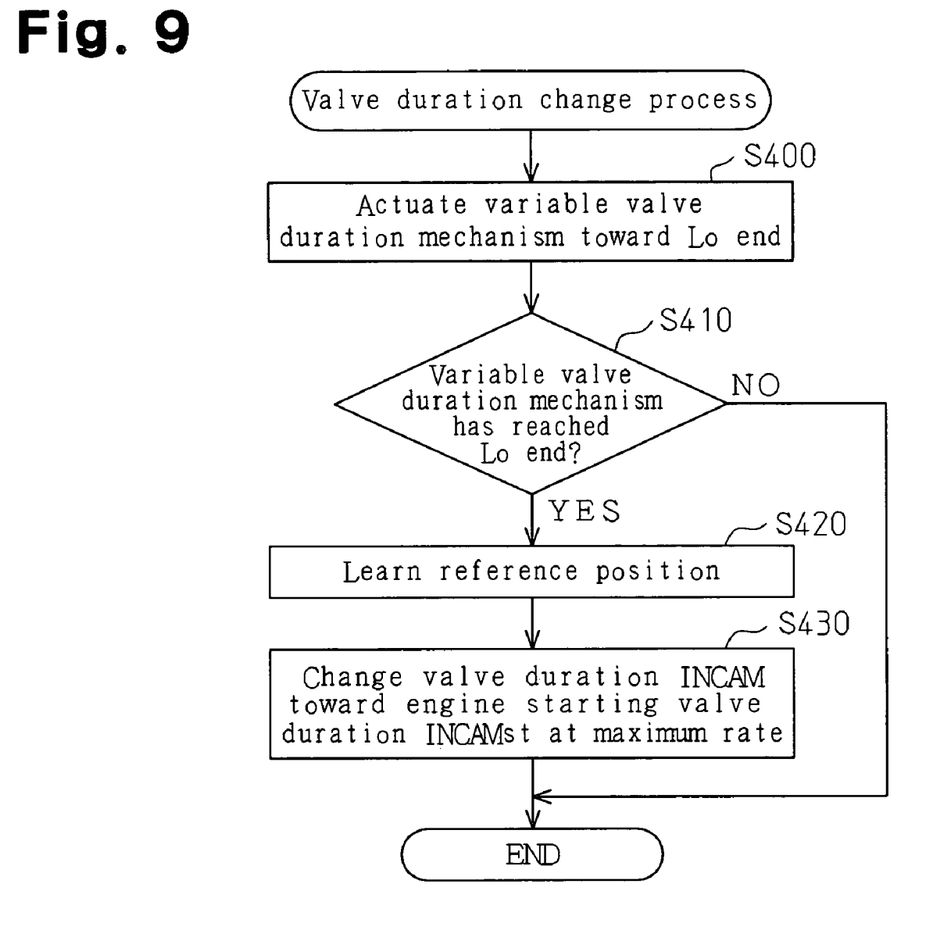
FIG. 9 is a flowchart showing a procedure of a valve duration change process according to the second embodiment.

FIG. 9 shows a procedure of the valve duration change process according to the second embodiment. The process is repeated at predetermined time intervals by the electronic control unit 60 after the delay control is started until the valve duration INCAM reaches the engine starting valve duration INCAMst.

When this process is started, at first step S400, the actuation position of the variable valve duration mechanism 53 is moved toward the Lo end, that is, an extreme position in the movable range of the variable valve duration mechanism 53 limited by limiting members such as stoppers. At the Lo end, the valve duration INCAM has the minimum value. In this case, the actuation rate of the variable valve duration mechanism 53 is preferably determined such that noise produced by collision of the movable members of the variable valve duration mechanism 53 against the limiting members such as stoppers is suppressed.

Then, whether the variable valve duration mechanism 53 has reached the Lo end is determined at step S410. In this embodiment, whether the variable valve duration mechanism 53 has reached the Lo end is determined based on changes in the current value of the electric motor 54 (changes in the current value itself or changes in the actuating duty ratio).

If it is determined that the variable valve duration mechanism 53 has not reached the Lo end (NO at step S410), this process is temporarily suspended. On the other hand, if it is determined that the variable valve duration mechanism 53 has reached the Lo end (YES at step S410), learning of a reference position is performed in relation to the actuation position of the variable valve duration mechanism 53 (at next step S420).

Then, when the learning of the reference position is completed, the valve duration INCAM is changed to the engine starting valve duration INCAMst at the maximum rate (at next step S430). When the valve duration INCAM reaches the engine starting valve duration INCAMst, this process is ended.

Figure 10:
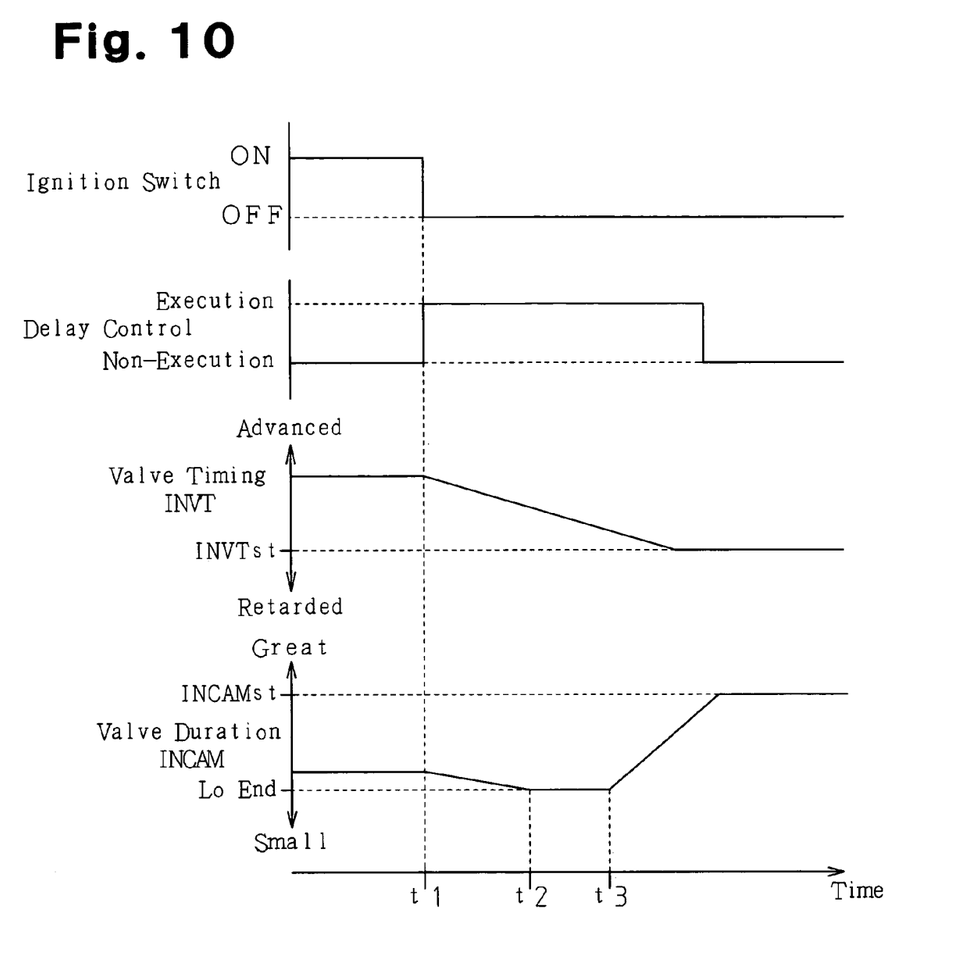
FIG. 10 is a time chart showing one example of changes in the valve timing and the valve duration when the valve duration change process according to the second embodiment is executed.

FIG. 10 shows changes in the valve timing INVT and the valve duration INCAM during the execution of the valve duration change process. FIG. 10 represents a situation where the ignition switch 97 is turned off during idling. As shown in FIG. 10, when the ignition switch 97 is turned off at time t1, the delay control is started. At the same time as the delay control is started, the valve timing INVT starts being changed toward the engine starting valve timing INVTst. Also, at the same time as the delay control is started, the variable valve duration mechanism 53 starts being actuated toward the Lo end. When the moving member of the variable valve duration mechanism 53 reaches the Lo end at time t2, the learning of the reference position is started. When the learning of the reference position is completed at time t3, the valve duration INCAM is changed toward the engine starting valve duration INCAMst at the maximum rate.

The valve actuation control apparatus according to the second embodiment has the following advantages.

(1) After the delay control is started, the valve timing INVT and the valve duration INCAM are changed to the engine starting valve timing INVTst and the engine starting valve duration INCAMst, respectively. In this embodiment, after the delay control is started, the actuation position of the variable valve duration mechanism 53 is changed toward the Lo end, temporarily. That is, since the actuation position of the variable valve duration mechanism 53 is changed to the reference position at which the valve duration INCAM is reduced, the valve duration INCAM after the start of the delay control is temporarily reduced. The change in the valve overlap is therefore reduced due to the change in the valve duration INCAM. Therefore, when changing the valve timing INVT and the valve duration INCAM during the execution of the delay control, the valve overlap is appropriately adjusted during the execution of the delay control. Also, the valve overlap is prevented from being excessively great.

When the learning of the reference position is completed, the valve duration INCAM is changed to the engine starting valve duration INCAMst at the maximum rate. At this time, since the valve duration INCAM is increased, the valve opening point IVO of the intake valve 19 is advanced. This increases the valve overlap. At the time (time t3) when the valve duration INCAM starts being changed toward the engine starting valve duration INCAMst, the valve timing INVT has already been delayed by a certain amount, the change in the valve timing INVT has delayed the valve opening point IVO of the intake valve 19. Therefore, even if the valve opening point IVO is advanced by the change in the valve duration INCAM, the advancement is cancelled to a certain extent by the retardation of the valve opening point IVO due to the change in the valve timing INVT. This prevents the valve overlap from being excessively increased due to the increase of the valve duration INCAM.

(2) To detect the actuation position of the variable valve duration mechanism 53, the actuation position of the variable valve duration mechanism 53 needs to be moved to the Lo end temporarily, and the reference position needs to be learned. If the learning of the reference position is performed during the normal operation of the engine 1, the valve duration INCAM of the intake valve 19 becomes different from the valve duration that corresponds to the engine operating state. This can degrade the operating state, and degrade the drivability (for example, the operability of the engine power). In this embodiment, however, the learning of the reference position is performed during the execution of the delay control. That is, since the learning of the reference position is performed after an engine stop request is made, the drivability is not degraded in the reference position learning unlike the case where the reference position is learned during the normal operation of the engine 1.

(3) If the reference position of the variable valve duration mechanism 53 is learned when the engine 1 is not operating, the engine operating state is not degraded. In this case, however, play (backlash) in the mechanical parts for actuating the variable valve duration mechanism 53 can degrade the accuracy of the learning of the reference position. In this embodiment, the learning of the reference position is performed during the execution of the delay control, that is, while the engine 1 is operating and a load in one direction is being applied to the drive system. Thus, the reference position is accurately learned without being influenced by the play.

The above embodiments may be modified as follows.

In the first embodiment, when changing the valve timing INVT and the valve duration INCAM after starting the delay control, the valve overlap is adjusted to be less than or equal to the predetermined value. More specifically, the valve overlap is changed to the amount that corresponds to the misfire limit value while the valve timing INVT and the valve duration INCAM are being changed. Alternatively, the valve timing INVT and the valve duration INCAM may be changed in the same manner such that the valve overlap is at least less than the amount that corresponds to the misfire limit value. In this case, compared to the case where the valve timing INVT and the valve duration INCAM are changed such that the valve overlap becomes the amount that corresponds to the misfire limit value, the internal EGR amount during the execution of the delay control is reduced. The occurrence of misfires is further reliably prevented.

In the first embodiment, the valve duration INCAM is changed based on the valve timing INVT such that the valve overlap becomes the amount that corresponds to the misfire limit value. Alternatively, the valve timing INVT may be changed based on the valve duration INCAM such that the valve overlap becomes the amount that corresponds to the misfire limit value.

In the second embodiment, when changing the valve duration INCAM after the completion of the learning of the reference position, that is, when changing the valve duration INCAM toward the engine starting valve duration INCAMst, the valve duration change process of FIG. 5 described in the first embodiment may be executed.

In an internal combustion engine that is automatically stopped during idling, the delay control described above may be executed when an automatic stop request is made. After the delay control is started, the valve timing INVT and the valve duration INCAM may be changed in the manner described in the first embodiment or the second embodiment. Accordingly, the above listed advantages are obtained even when the engine is automatically stopped.

The present invention may be applied according to the same principle disclosed herein to an internal combustion engine in which an intake valve 19 is provided with a variable valve duration mechanism 53, and an exhaust valve 20 is provided with a variable valve timing mechanism 51. The present invention may also be applied according to the same principle disclosed herein to an internal combustion engine in which an exhaust valve 20 is provided with a variable valve timing mechanism 51 and a variable valve duration mechanism 53, or to an internal combustion engine in which an intake valve 19 is provided with a variable valve timing mechanism 51 and an exhaust valve 20 is provided with a variable valve duration mechanism 53.

The invention claimed is:

1. A valve actuation control apparatus for an internal combustion engine, the engine having a variable valve timing mechanism that changes valve timing of an engine valve and a variable valve duration mechanism that changes valve duration of the engine valve, the apparatus comprising a control section that controls the variable valve timing mechanism and the variable valve duration mechanism, wherein, after a delay control for extending a period from when an engine stop request is made to when the engine actually stops is started, the control section changes the valve timing and the valve duration to valve timing and valve duration suitable for starting the engine, and wherein, when changing the valve timing and the valve duration after the start of the delay control, the control section changes one of the valve timing and the valve duration based on the other such that a valve overlap becomes less than or equal to a predetermined value.

2. The apparatus according to claim 1, wherein the engine valve is an intake valve, wherein the valve timing suitable for starting the engine is set to valve timing that is delayed relative to valve timing for idling, and wherein the valve duration suitable for starting the engine is set to valve duration that is greater than valve duration for idling.

3. A valve actuation control apparatus for an internal combustion engine, the engine having a variable valve timing mechanism that changes valve timing of an engine valve and a variable valve duration mechanism that changes valve duration of the engine valve, the apparatus comprising a control section that controls the variable valve timing mechanism and the variable valve duration mechanism, wherein, after a delay control for extending a period from when an engine stop request is made to when the engine actually stops is started, the control section changes the valve timing and the valve duration to valve timing and valve duration suitable for starting the engine, and wherein, when changing the valve timing and the valve duration after the start of the delay control, the control section changes one of the valve timing and the valve duration based on the other such that a valve overlap becomes an amount that corresponds to a misfire limit value.

4. The apparatus according to claim 3, wherein, when a misfire occurs while the valve timing and the valve duration are being changed, the control section learns, as a misfire occurrence value, the combination of the valve timing and the valve duration at the time of the misfire occurrence, and wherein, when changing the valve timing and the valve duration, the control section changes the valve timing and the valve duration such that the valve overlap is maximized while avoiding a misfire occurrence range defined by the misfire occurrence value.

5. The apparatus according to claim 3, wherein the engine valve is an intake valve, wherein the valve timing suitable for starting the engine is set to valve timing that is delayed relative to valve timing for idling, and wherein the valve duration suitable for starting the engine is set to valve duration that is greater than valve duration for idling.

6. A valve actuation control apparatus for an internal combustion engine, the engine having a variable valve timing mechanism that changes valve timing of an engine valve and a variable valve duration mechanism that changes valve duration of the engine valve, an actuation position of the variable valve duration mechanism is determined based on a relative movement amount from a reference position, the apparatus comprising a control section that controls the variable valve timing mechanism and the variable valve duration mechanism, wherein, after a delay control for extending a period from when an engine stop request is made to when the engine actually stops is started, the control section changes the valve timing to valve timing suitable for starting the engine, changes the actuation position of the variable valve duration mechanism to the reference position where the valve duration is reduced, learns the reference position, and thereafter changes the valve duration to valve duration suitable for starting the engine.

7. The apparatus according to claim 6, wherein the engine valve is an intake valve, wherein the valve timing suitable for starting the engine is set to valve timing that is delayed relative to valve timing for idling, and wherein the valve duration suitable for starting the engine is set to valve duration that is greater than valve duration for idling.

* * * * *